Jan. 6, 1931. Y. INAMI 1,787,908
PERMANENT FISH LURE
Filed Jan. 5, 1928
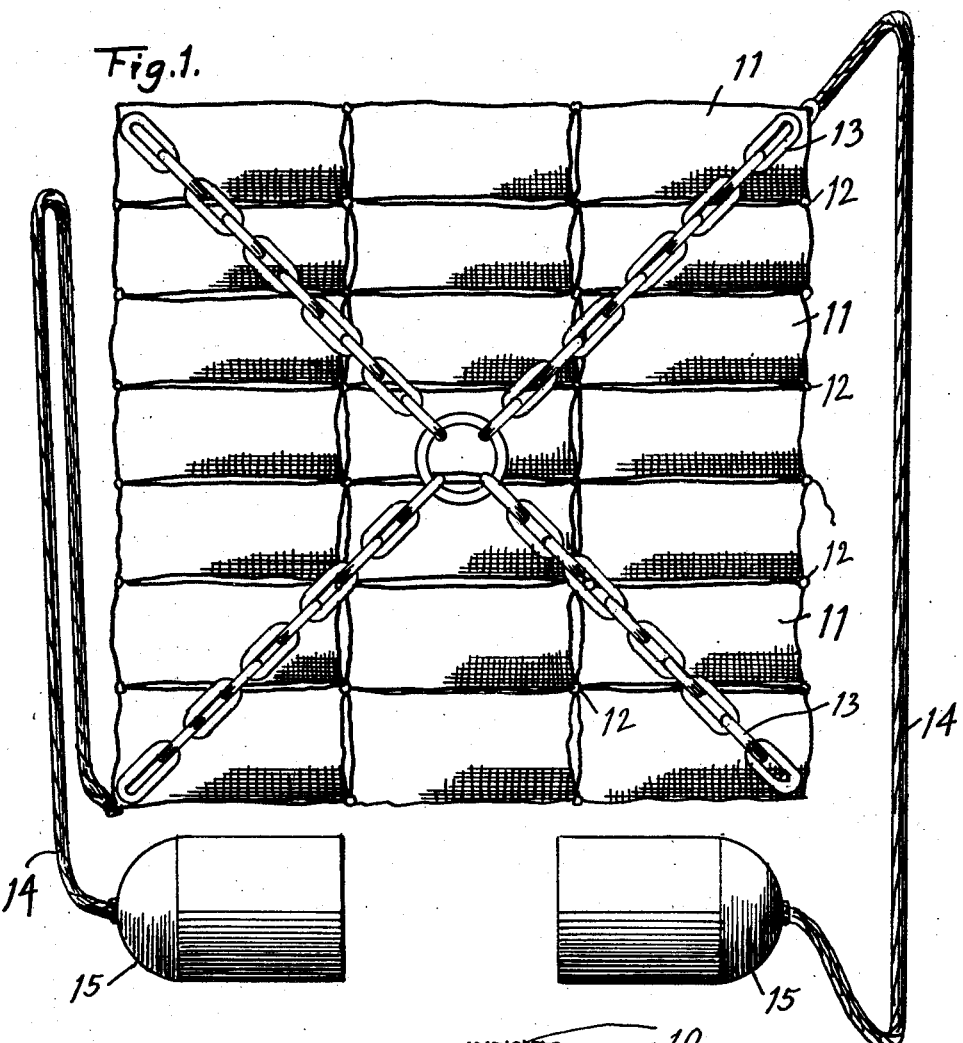
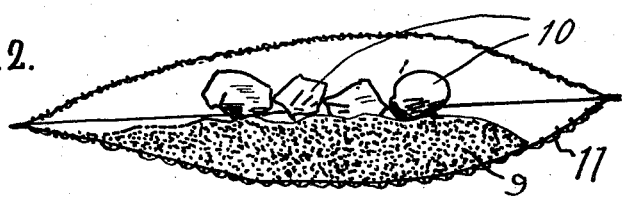
INVENTOR:
YAICHIRO INAMI.
BY ATTY:

Patented Jan. 6, 1931

1,787,908

UNITED STATES PATENT OFFICE

YAICHIRO INAMI, OF LOS ANGELES, CALIFORNIA

PERMANENT FISH LURE

Application filed January 5, 1928. Serial No. 244,669.

This invention relates to an improved fish lure adapted for use in catching fish. It relates to that class in which a bait serves as an attraction for drawing the fish to a certain pot or locality where they may be taken with hook and line or with a net.

It involves certain novel features which will be hereinafter set forth.

The drawings illustrate a particular embodiment of the invention which I have found to be the most practical in use.

In the drawings, Figure 1 is a plan view of my permanent fish lure. Fig 2 is a sectional detail view of one of the fish lure elements.

Referring to the drawings, the fish lure consists of a plurality of canvas bags 11, which are adapted to be placed upon the bottom of a lake or the ocean at the locality selected for the fishing operations. These bags may be connected at some corner 12, with one another. Within these bags, I place some bait material, preferably a mixture of beans, cottonseed, bone meal and fish meal, or any one of them, within each bag. In each bag I place one or more rocks or stones 10, to cause the bag to sink to the bottom of the water. Upon these bags, I place two or more chains 13, or other weights to prevent the shifting of the bags from their position, and at two corners, I provide cables 14, which reach to the surface of the water, and which are connected to buoys 15.

In lieu of the weight elements 10, I may employ sand or gravel, and the same may be mixed with the bait material or not as desired, or the sand or gravel may be used in conjunction with the rocks 10. The purpose of the sand or gravel is to cause the bait material to more slowly ferment, and to cause the same to more slowly permeate the water, also to form the weight that will cause the bags to sink.

A net may be used in fishing, in which case, the buoys may be removed. The bags may be emplaced a sufficient time in advance of the fishing operations, whereby small shells and moss will be grown upon the surface of the bags. These will further serve to attract the fish.

In use, this apparatus is taken to the fishing place selected, and is allowed to sink to the bottom of the water. The bait, formed from the materials enumerated, will very slowly decay and disintegrate, and will meanwhile permeate the water in the vicinity in a manner to lure and attract the fish. The fish may then be taken by fish line and hook, or by a net, as desired. The lure as set forth, will serve for some length of time.

What is claimed is:

1. In a permanent fish lure, a series of canvas fabric bags connected to one another, a material in each bag forming a scent in the vicinity of the surrounding water, a weight disposed in each bag, a plurality of chains disposed on the top of the bags, a plurality of cables extending upwardly from the bags, and buoys connected to the cables.

2. In a permanent fish lure, a series of fabric bags loosely connected to one another to form a bait receptacle, a bait material disposed in each bag, anchoring weights within and on the top of the bags, cables extending from the bags upwardly, and buoys fixed to the cables.

In testimony whereof, I hereunto affix my signature.

YAICHIRO INAMI.